(12) United States Patent
Zhang (10) Patent No.: US 9,336,461 B2
(45) Date of Patent: May 10, 2016

(54) ELECTRONIC CARD CONNECTOR HAVING EJECTING MECHANISM

(71) Applicant: FOXCONN INTERCONNECT TECHNOLOGY LIMITED, Grand Cayman (KY)

(72) Inventor: Wei-De Zhang, Shenzhen (CN)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 14/598,179

(22) Filed: Jan. 15, 2015

(65) Prior Publication Data
US 2015/0200475 A1     Jul. 16, 2015

(30) Foreign Application Priority Data

Jan. 15, 2014    (CN) .......................... 2014 1 0017243

(51) Int. Cl.
*H01R 13/62*      (2006.01)
*G06K 13/08*      (2006.01)

(52) U.S. Cl.
CPC .................................. *G06K 13/0825* (2013.01)

(58) Field of Classification Search
CPC ............... H01R 13/635; H01R 13/633; H01R 13/6335; G06K 13/08; G06K 13/0806; G06K 7/0021; H05K 5/0295

USPC .......................................... 439/159, 160, 630
See application file for complete search history.

(56) References Cited

U.S. PATENT DOCUMENTS

| | | | |
|---|---|---|---|
| 6,379,167 B1 * | 4/2002 | Zhang ................ | G06K 13/0806 439/157 |
| 6,814,597 B1 | 11/2004 | Kao | |
| 7,670,160 B2 | 3/2010 | Tsuji | |
| 7,927,115 B2 * | 4/2011 | Sun ..................... | H01R 12/7094 439/159 |
| 8,308,495 B2 * | 11/2012 | Yu ...................... | H01R 12/7094 439/159 |

FOREIGN PATENT DOCUMENTS

| | | |
|---|---|---|
| CN | 2563779 | 7/2003 |
| TW | M317093 | 8/2007 |
| TW | M432992 | 7/2012 |

* cited by examiner

*Primary Examiner* — Hien Vu
(74) *Attorney, Agent, or Firm* — Wei Te Chung; Ming Chieh Chang (57) ABSTRACT

An electronic card connector (100) includes an insulative housing (1), a number of terminals (2) retained in the insulative housing, a metal shell (4) having an elastic piece (4), and an ejecting mechanism (5) located on a side of the insulative housing. The ejecting mechanism includes a slider (51) and a resilient mechanism. The slider is urged by the elastic piece to assume a final position when an electronic card is fully inserted. A part of the resilient mechanism is moveable forwardly to engage the slider and then is backwardly moveable together with the engaged slider to eject the inserted electronic card.

10 Claims, 10 Drawing Sheets

ELECTRONIC CARD CONNECTOR HAVING EJECTING MECHANISM

BACKGROUND OF THE INVENTION

1. Field of the Invention

The present invention relates generally to an electronic card connector, and more particularly to an electronic card connector having an ejecting mechanism.

2. Description of Related Arts

U.S. Pat. No. 7,670,160 discloses an electronic card connector comprising a slider having a heart-shaped cam groove and a lock spring. The slider is designed for insertion/removal of a card provided with a notch-like lock concave portion. U.S. Pat. No. 6,814,597 discloses a card connector having an ejector designed for working with a Subscriber Identity Module (SIM) card. The ejector comprises a slider which moves together with a thin SIM card (without a notch-like portion) to be inserted or rejected, a push rod, and a pivotable lever coupled between the slider and the push rod.

An electronic card connector having an improved ejecting mechanism is desired.

SUMMARY OF THE INVENTION

Accordingly, an object of the present invention is to provide an electronic card connector having an ejecting mechanism to attain efficient lock and ejection.

To achieve the above object, an electronic card connector includes an insulative housing, a number of terminals retained in the insulative housing, a metal shell having an elastic piece having a flexible piece, and an ejecting mechanism located on a side of the insulative housing. The elastic piece has a flexible piece. The ejecting mechanism has a slider and a resilient mechanism. The slider is urged by the flexible piece to assume a final position when an electronic card is fully inserted. A part of the resilient mechanism is moveable forwardly to engage the slider and then is backwardly moveable together with the engaged slider to eject the inserted electronic card.

Other objects, advantages and novel features of the invention will become more apparent from the following detailed description when taken in conjunction with the accompanying drawings.

DETAILED DESCRIPTION OF THE PREFERRED EMBODIMENT

Reference will now be made in detail to the preferred embodiment of the present invention.

Referring to FIGS. 1 to 10, an electronic card connector 100 of the present invention includes an insulative housing 1, a plurality of terminals 2 and a metal sheet 3 affixed to the insulative housing 1, a metal shell 4 attached to the insulative housing 1 and defining a receiving cavity 10 therebetween, and an ejecting mechanism 5 located in one side of the insulative housing 1 and received in the receiving cavity 10. The electrical connector 100 defines a card-inserting direction, a front end, and a rear end as viewed with reference to FIG. 1.

Figure 1:
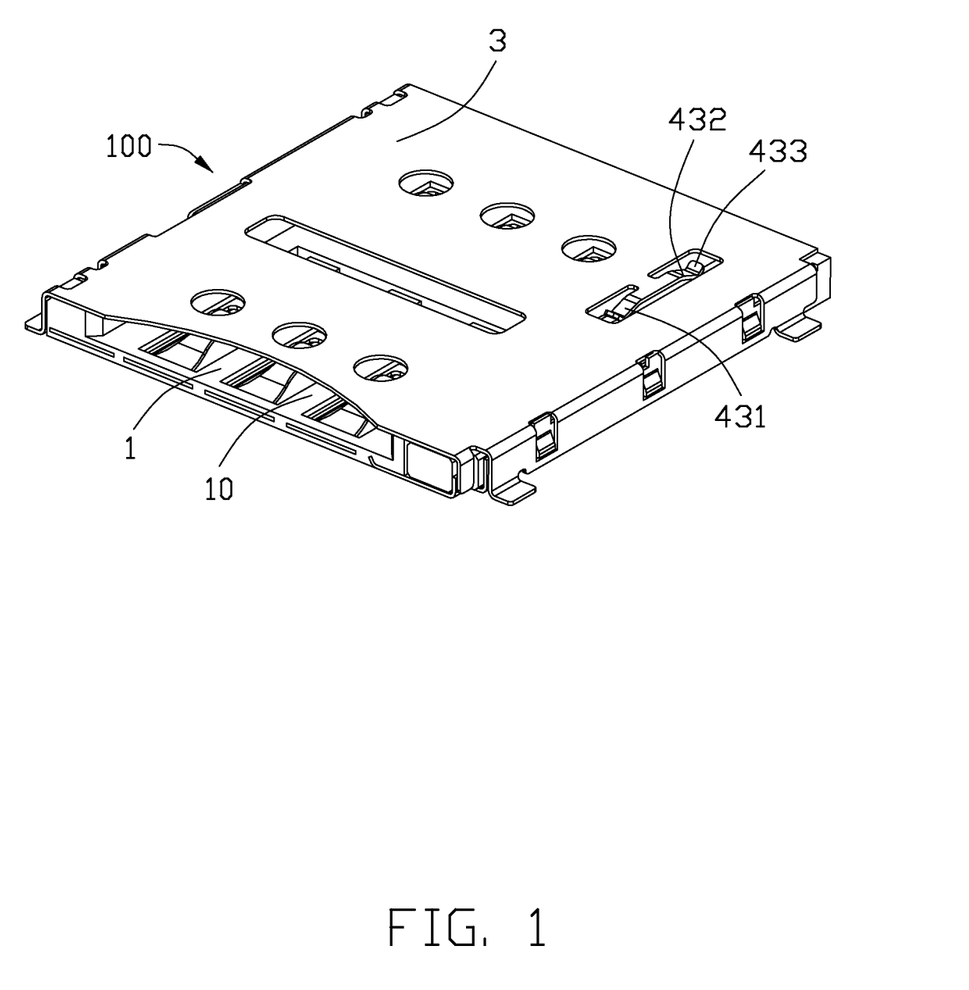
FIG. 1 is a perspective, assembled view of an electronic card connector.
Figure 2:
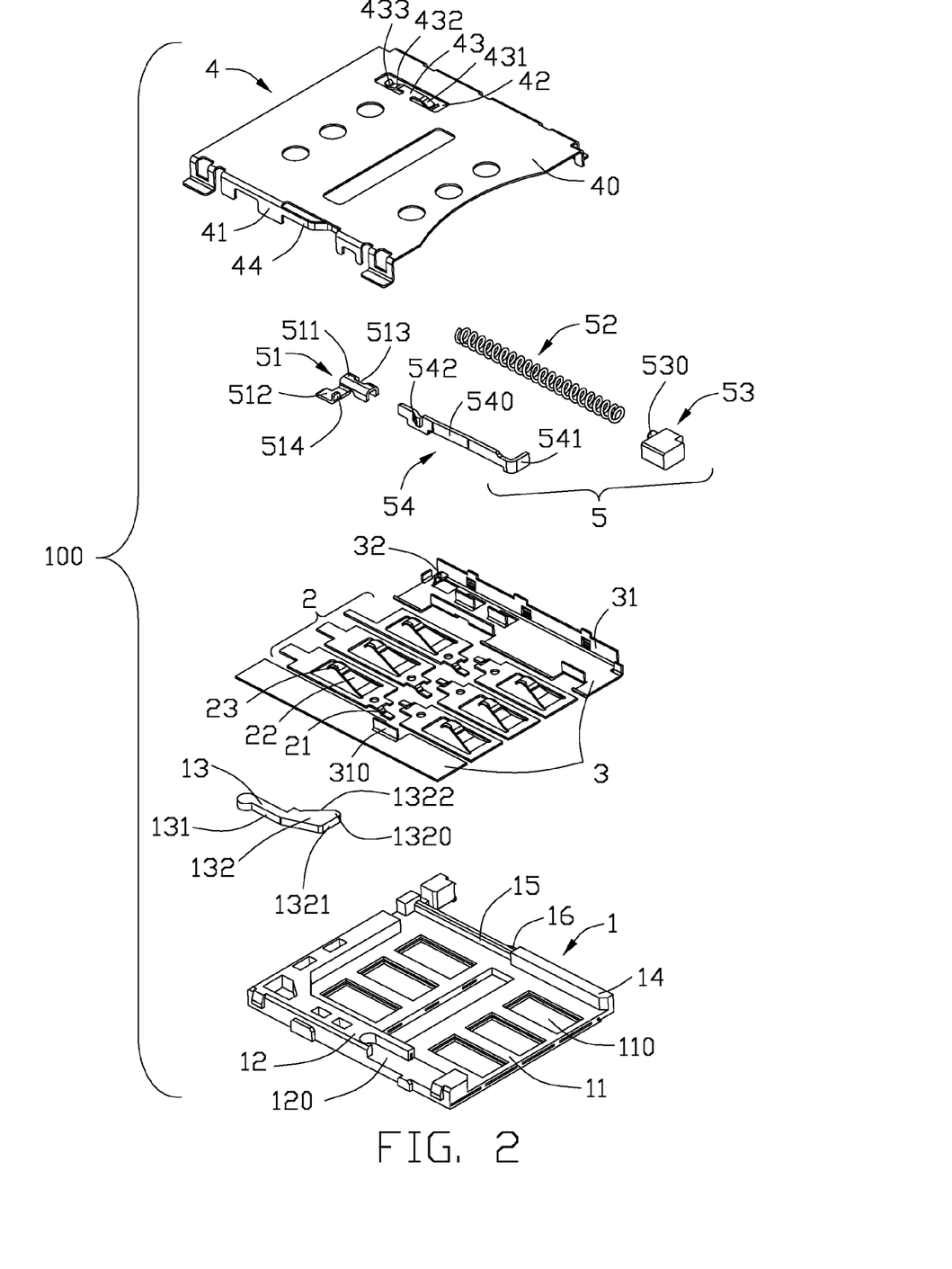
FIG. 2 is a perspective, exploded view of the electronic card connector.
Figure 3:
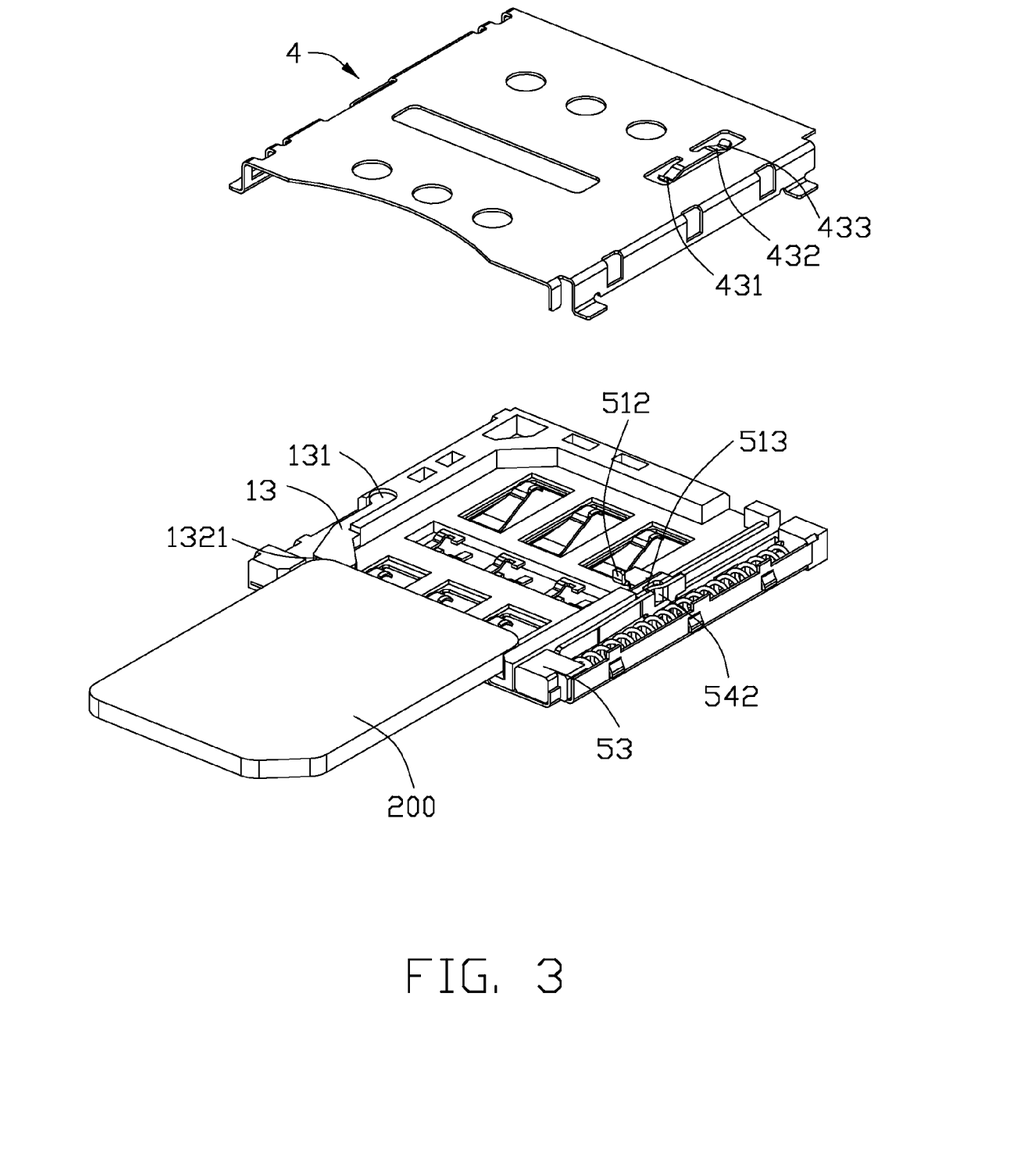
FIG. 3 is a perspective, partly exploded view of the electronic card connector, showing a wrong insertion of a card.

Referring to FIGS. 2 and 3, the insulative housing 1 includes a base portion 11, a side portion 12 insert-molded with the insulative housing 1, and fool-proofing mechanism 13 seated in the side portion 12. The base portion 11 is formed with a number of receiving rooms 110 arranged in two rows. The side portion 12 has a first receiving room 120 to receive the fool-proofing mechanism 13. The fool-proofing mechanism 13 defines a pivoting arm 131 fixed in the side portion 12 and an acting arm 132 forming an obtuse angle relative to the pivoting arm. The acting arm 132 is formed with a panel portion 1321 along a transverse direction perpendicular to the card-inserting direction, an inclining portion 1322 forming an acute angle with respect thereto, and an elbowing portion 1320 connected with the panel portion 1321 and the inclining portion 1322. The insulative housing 1 further has a bumping portion 14 seated in the right side of the base portion 11 and a sliding track 15 seated with the bumping portion 14 side by side and extending along the card-inserting direction. The base portion 11 has a pushing bulge 16 seated outwardly of an end of the sliding track 15.

The terminals 2 are located in two rows and received in the receiving groove 110. Each terminal 2 includes a soldering portion 21, a fixed portion 22 retained in the insulative housing 1, and a contacting portion 23 projecting into the receiving cavity 10.

Figure 4:
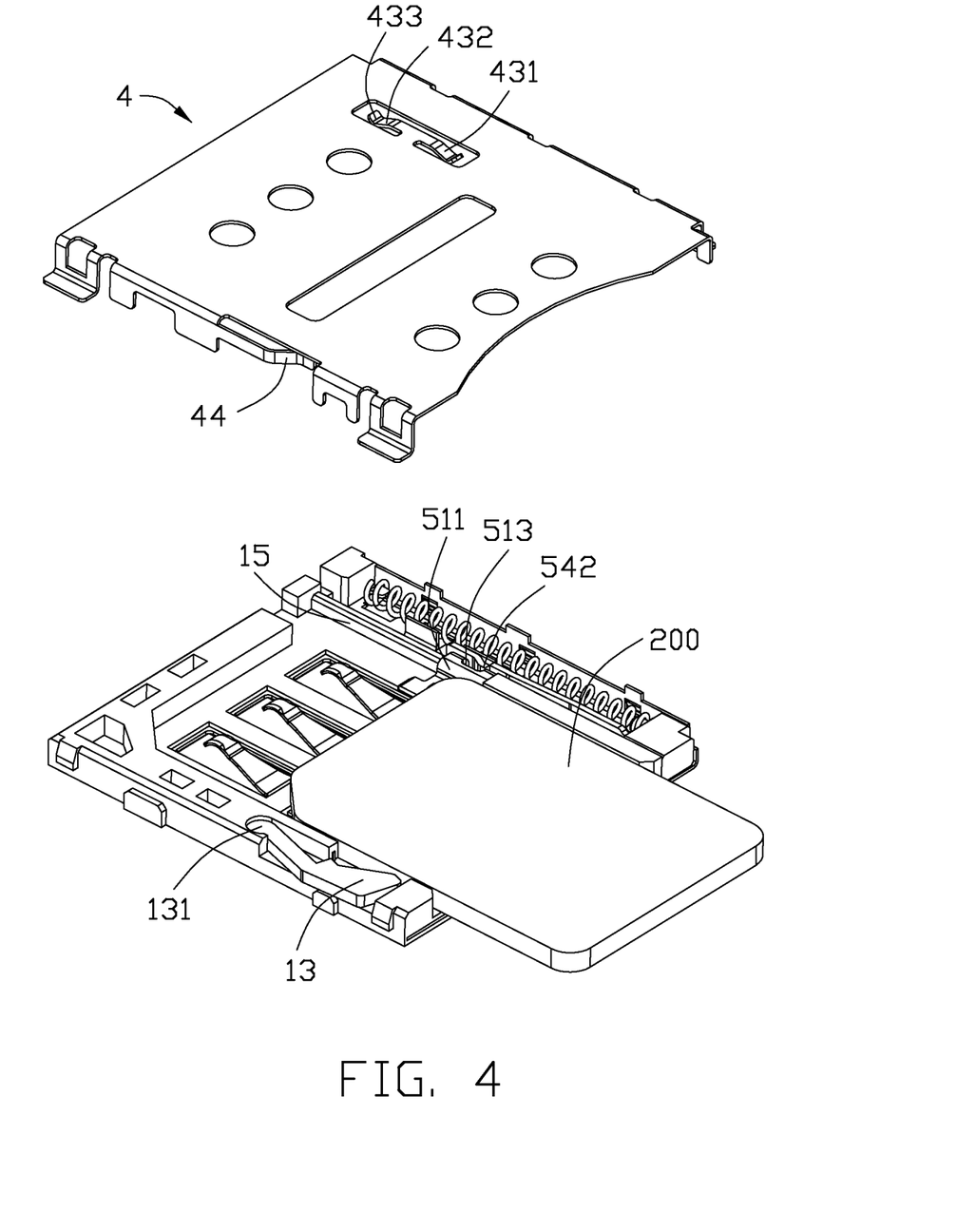
FIG. 4 is a perspective view of the electronic card inserted into the electrical connector where a metal shell thereof is shown separated from an insulative housing thereof.
Figure 5:
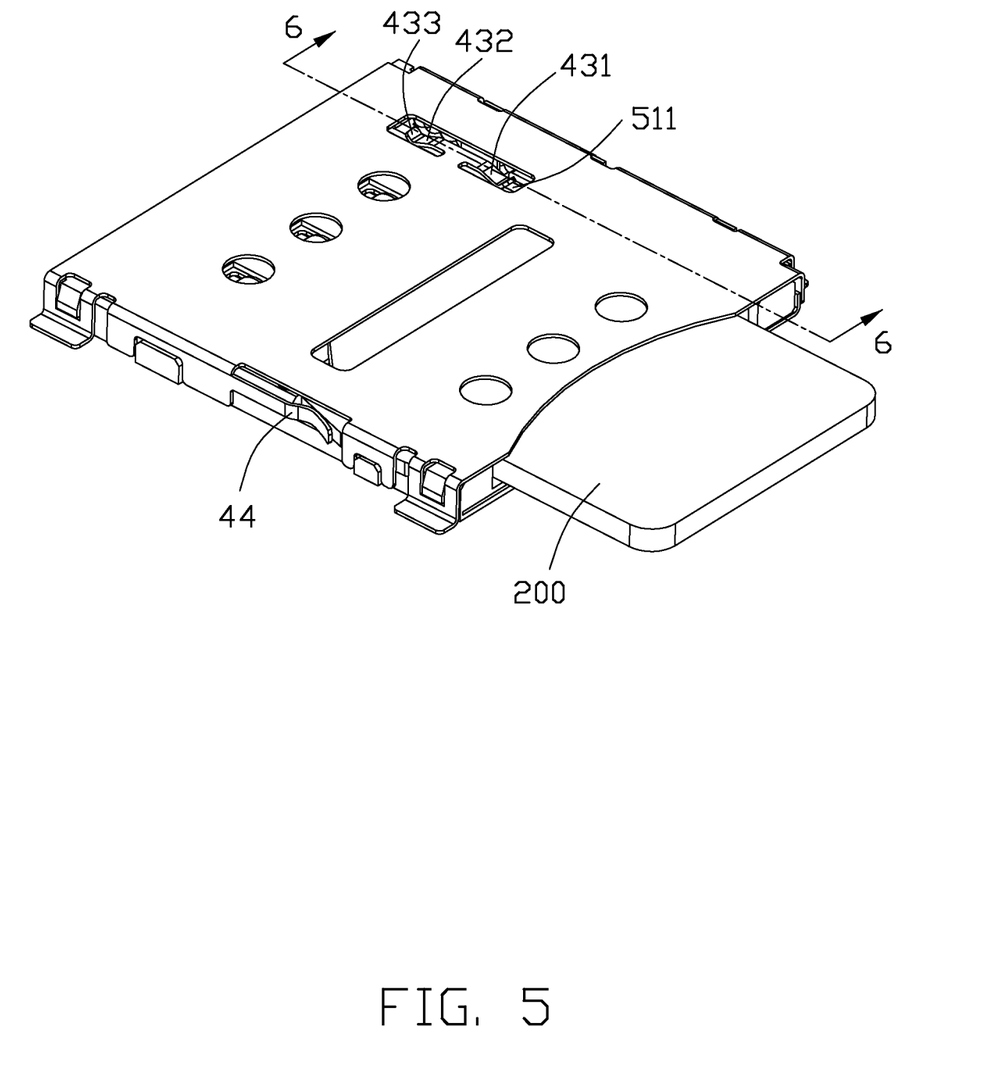
FIG. 5 is a perspective, assembled view of the electronic card inserted into the electrical connector.
Figure 6:
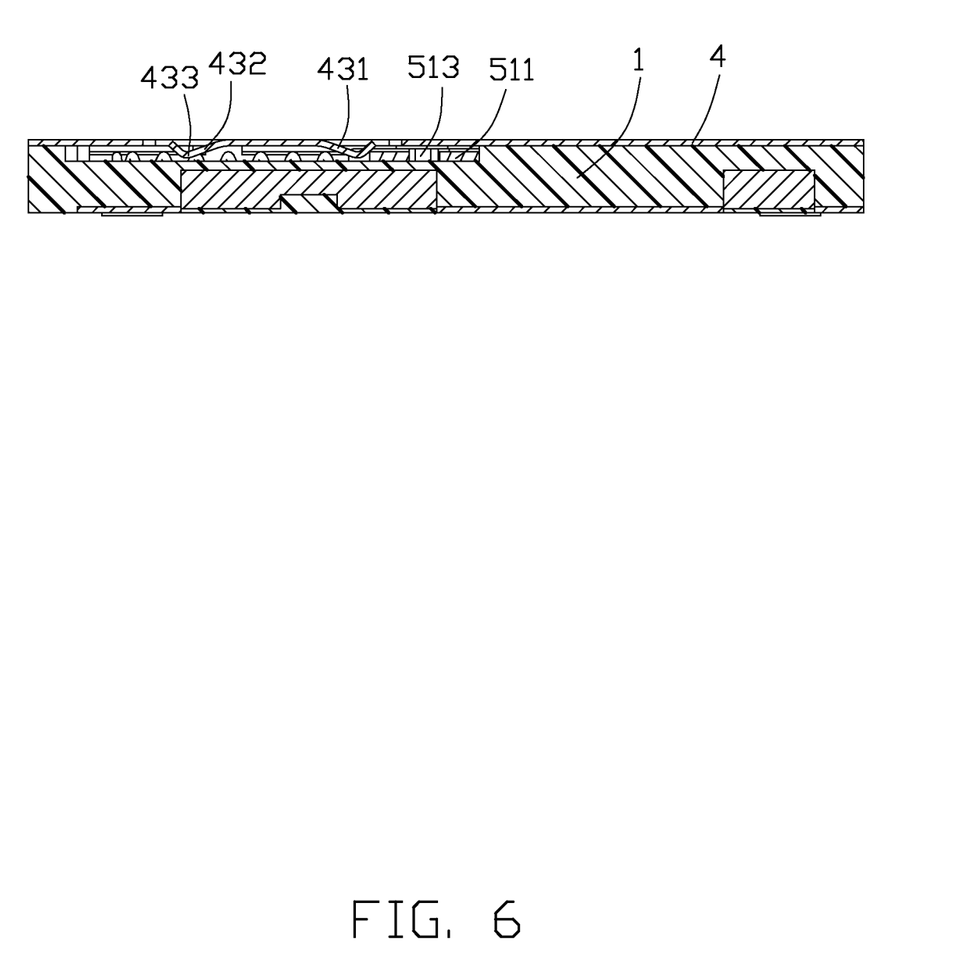
FIG. 6 is a cross-sectional view of the electrical connector, taken along line 6-6 in FIG. 5.

Referring to FIGS. 3 to 5, the metal sheet 3 is located in two sides of the terminals 2 and is formed with a side board 31 forming the receiving cavity 10 with the insulative housing 1 and a snagging arm 32.

The metal shell 4 includes a top wall 41 and a pair of side walls 42 extending downwardly from the top wall 41. The metal shell 4 further has a holding hole 42 at a front edge of the top wall 41 and an elastic piece 43 located in the holding hole 42 and extending along the card-inserting direction from an inner edge of the holding hole 42. The elastic piece 43 includes a curved piece 431 bent downwardly, a flexible piece 432, and a pair of guiding pieces 433 projecting from two free ends of the curved piece 431 and the flexible piece 432. The left side wall 41 has a pressing piece 44 extending along the card-inserting direction and the front end of the pressing piece 44 is separated from the side wall 41.

Referring to FIGS. 2-5 and 8, the ejecting mechanism 5 located in the metal sheet 3 includes a slider 51, a spring 52, a slipping bulge 53 seated beside the bumping portion 14, and a lever 54. The slider 51 is formed with a main portion 511 extending along the card-inserting direction, a side panel 512 extending from the main portion 511 and exposed to the receiving cavity 10, a hollow 513 located in the right of the main portion 511, and a driving portion 514 rising from a rear end of the side panel 512. The slipping bulge 513 is formed with a convex pillar 530 so that one end of the spring 52 is fixed in the snagging arm 31 and the other is fixed in the convex pillar 530. The lever 54 is formed with a main body 540, a hook 541 located in the slipping bulge 53, a buckling portion 542 extending upwardly from the main body 540 and exposed to the receiving cavity 10, a depression 543 located in the bottom of the main body 540 and receiving the pushing bulge 16, and a baffle 544 located in front of the depression 543 and at the bottom of the main body 540. The front end of the buckling portion 542 is connected with the main body 540 to form an angular surface therebetween while the rear end thereof splits from the main body 540. Prior to insertion of the electronic card 200 into the electronic card connector 100, the buckling portion 542 is not engaged or connected to the hollow 513 because the pushing bulge 16 is pushing the baffle 544 outward.

Referring to FIG. 4, when the electronic card 200 is inserted in the electronic card connector 100 in a wrong way, a right-angle portion (not labeled) of the electronic card 200 is resisted against by the panel portion 1321 to prevent the fool-proofing mechanism 13 from rotating outside such that the electronic card 200 is unable to get into the electronic card connector 100.

Figure 7:
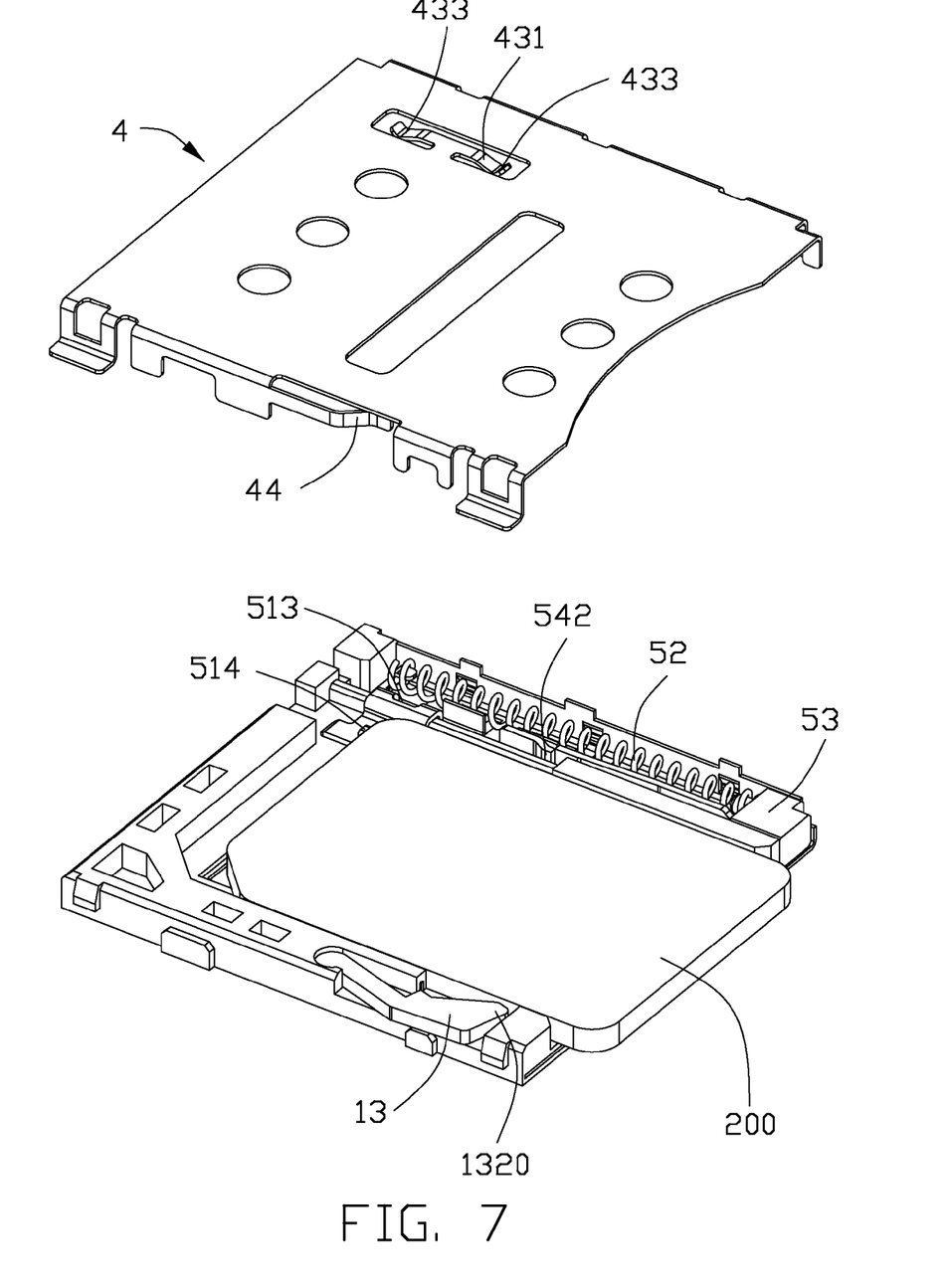
FIG. 7 is a perspective view showing the electronic card inserted into the electrical connector.
Figure 8:
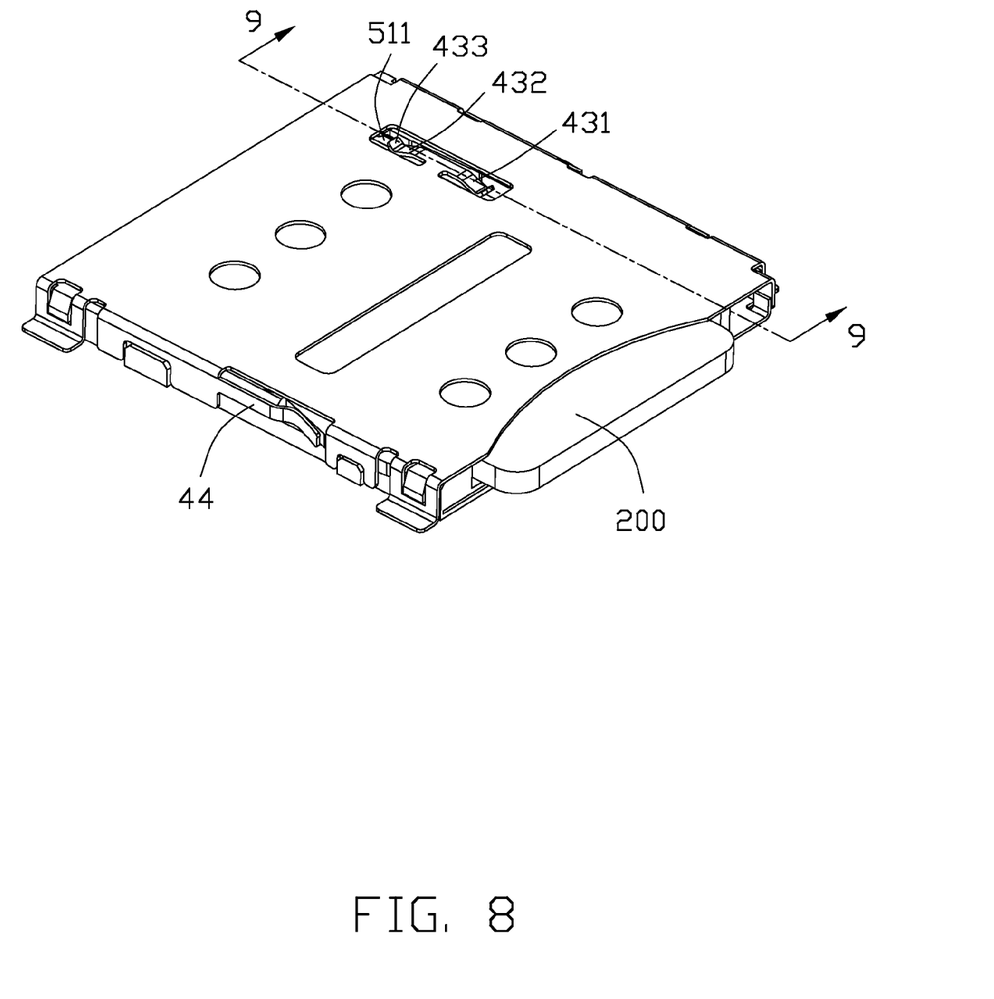
FIG. 8 is a perspective view showing the electronic card totally inserting the electrical connector.
Figure 9:
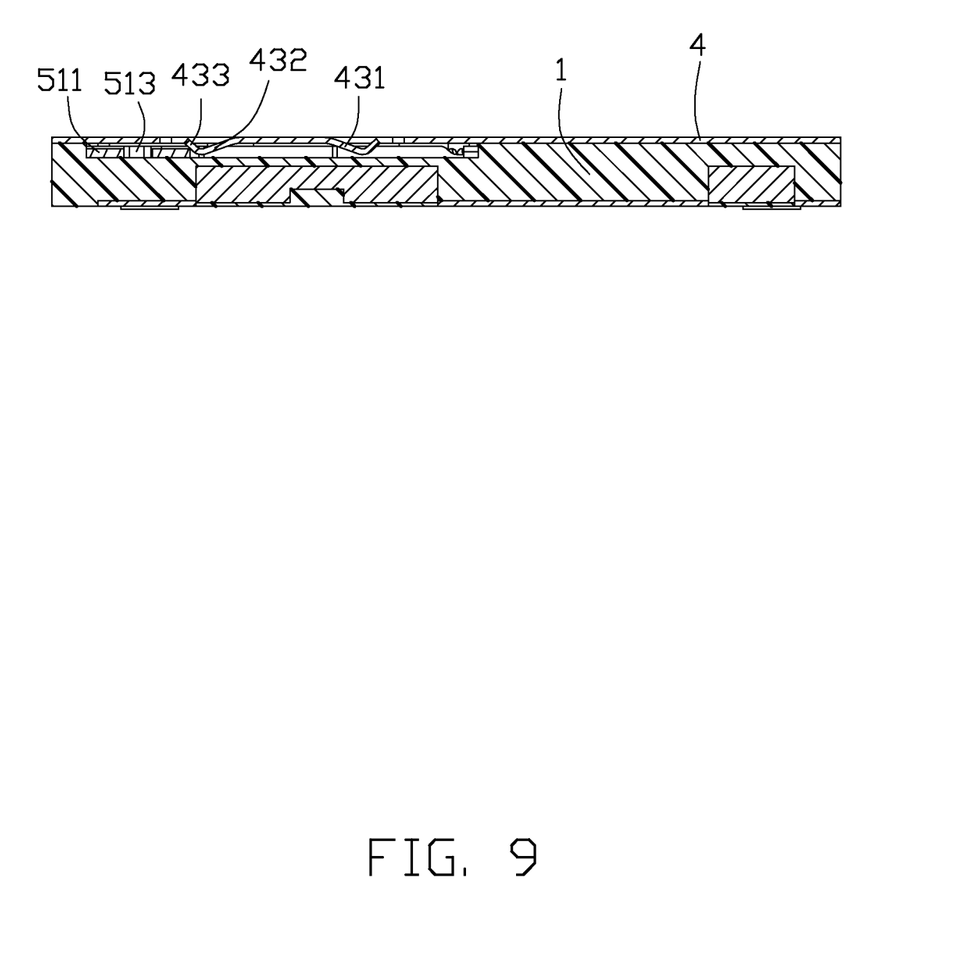
FIG. 9 is a cross-sectional view of the electrical connector, taken along line 9-9 in FIG. 8.
Figure 10:
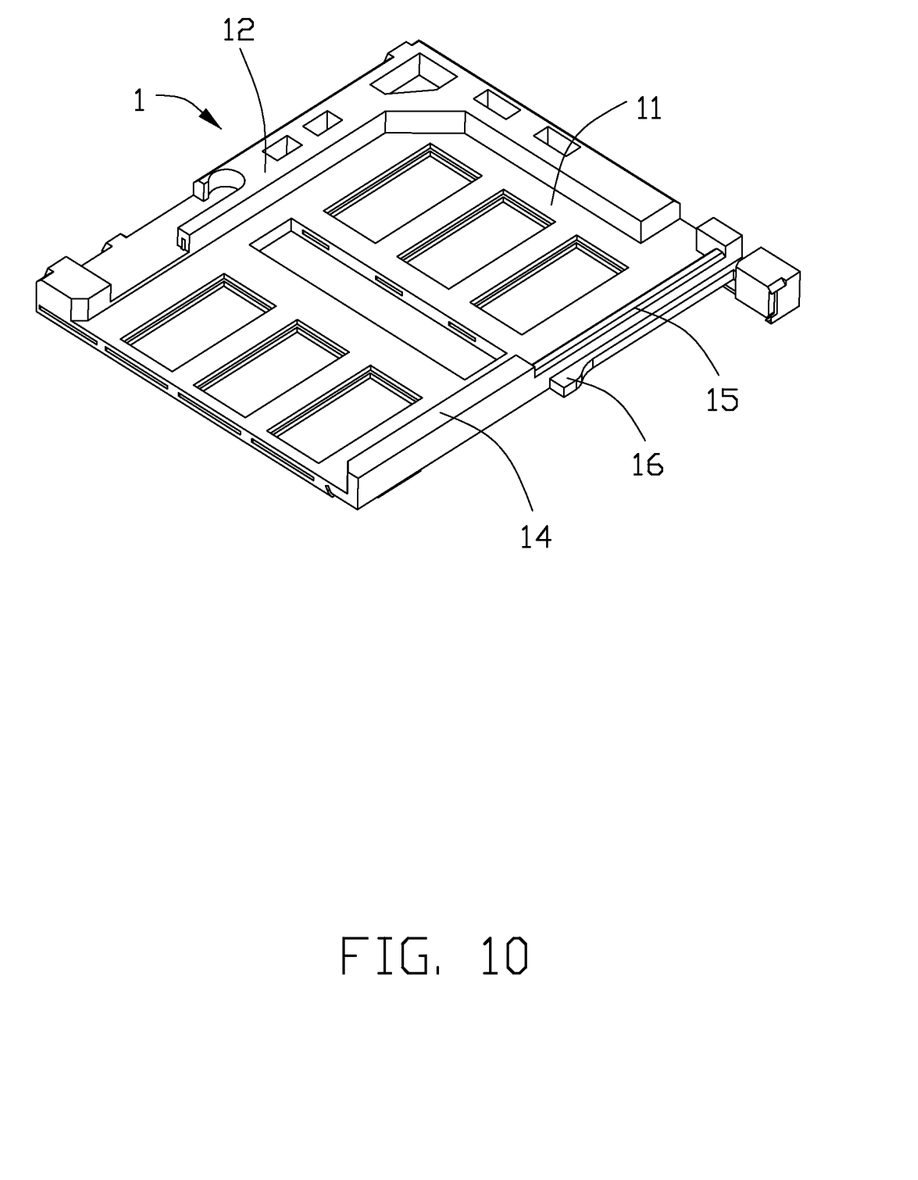
FIG. 10 is a perspective view of an insulative housing of the electrical connector.

The tray 5 is movable between an original position and a final position. The front edge of main portion 511 is resisted against by the curved piece 431 of the elastic piece 43 and the buckling portion 542 of the lever 54 is unconnected with the hollow 513 while the acting arm 132 is partly received in the receiving cavity 10. Referring FIGS. 4 to 6, when the electronic card 200 having a chamfer (not labeled) is inserted into the electronic card connector 100, the chamfer of the electronic card 200 is connected with elbowing portion 1320 to make the fool-proofing mechanism 13 move outwardly along with the insertion of the electronic card 200. When the electronic card 200 is inserted, a rear end of the electronic card 200 is connected with the driving portion 514 to drive the slider 51 to slide forwardly under the elastic piece 43 with the guidance of the guiding piece 431. Referring to FIGS. 7 to 9, when the electronic card 200 is inserted into the electronic card connector 100 totally, the slider 51 is located at a front edge of the sliding track 15, thus arriving at a final position. When the electronic card 200 is ejected, the slipping bulge 53 is driven by an external force to slide backwardly so that the spring 52 is compressed to the final position, the lever 54 move forwardly to make depression 543 across the pushing bulge 16 and then the buckling portion 542 of the lever 54 is received in the hollow 513. When the external force is removed, due to resilience or a returning force of the spring 52, the slipping bulge 53 drives the lever 54 and the slider 51 to move backwardly and then the driving portion 514 pushes the electronic card 200 to withdraw from the receiving cavity 10. After that, the spring 52 and the lever 54 return back to the original position, and the pushing bulge 16 pushes the baffle 544 to disengage the locked buckling portion 542 from the hollow 513 so that the slider 51 can be separated from the lever 54.

The preferred embodiment of the present invention is that the ejecting mechanism 5 is cooperated with the elastic piece 43 to attain the efficiency of locking and ejecting. The spring 52, the slipping bulge 53, and the lever 54 can be collectively termed a resilient mechanism.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. An electronic card connector comprising:
an insulative housing defining a receiving cavity;
a plurality of terminals retained in the insulative housing;
a metal shell having a top wall, an elastic piece extending into a holding hole of the top wall; and an ejecting mechanism located on a side of the insulative housing and including a slider and a resilient mechanism;
wherein the slider is urged by the elastic piece to a final position when an electronic card is fully inserted;
wherein a part of the resilient mechanism is moveable forwardly to engage the slider and then is backwardly moveable together with the engaged slider to eject the inserted electronic card;
wherein said elastic piece has a flexible piece and a curved piece, the slider is movable by an inserted electronic card from an original position to the final position, a rear end of the slider is resisted against by the flexible piece at the final position, and a front end of the slider is resisted against by the curved piece at the original position,
wherein each of the curved piece and the flexible piece has a guiding piece curling upward from a free end thereof to guide a movement of the slider under the elastic piece;
wherein the resilient mechanism has a buckling portion and the slider has a hollow for receiving the buckling portion; and
wherein said insulative housing has a pushing bulge outside the sliding track, the resilient mechanism includes a lever having a bottom depression for accommodating the pushing bulge, and a lower baffle located in front of the depression, and the pushing bulge pushes the baffle laterally during ejecting an inserted card to disengage the buckling portion from the hollow.

2. The electronic card connector as claimed in claim 1, wherein the elastic piece and the curved piece cooperate with the insulative housing to retain the slider at the final and original positions.

3. The electronic card connector as claimed in claim 1, wherein the slider has a main body connected with a front end of the buckling portion, and a rear end of the buckling portion splits from the main body.

4. The electronic card connector as claimed in claim 1, wherein said insulative housing has a sliding track, and the slider has a main portion mounted to the sliding track, a side panel extending from the main portion and exposed to the receiving cavity, and a driving portion for resisting an inserted electronic card.

5. The electronic card connector as claimed in claim 1, further comprising a fool-proofing mechanism, a free end of fool-proofing mechanism being pivotably confined to the insulative housing, the fool-proofing mechanism having a panel portion, an inclining portion forming an acute angle relative to the panel portion, and an elbowing portion connected with the panel portion and the inclining portion.

6. The electronic card connector as claimed in claim 5, wherein said metal shell has a pressing piece for limiting an outward movement of the fool-proofing mechanism.

7. A method of ejecting an electronic card from an electrical connector, comprising steps of:
providing the electrical connector with an insulative housing defining a card receiving space, and a plurality of contacts with contacting sections exposed in the card receiving space;
providing a rejecting mechanism with a slider moveable back and forth along a front-to-back direction between opposite outer and inner positions, and a lever back and forth moveable along said front-to-back direction between opposite outer and inner locations;

providing means for having the slider and the lever moving forwardly from the corresponding outer position and outer location to the corresponding inner position and inner location in a way independent from each other while moving rearwardly from the corresponding inner position and inner location to the corresponding outer position and outer location in another way associated and co-moving with each other;

providing means for having the slider move forward via insertion of the electronic card, and means for retaining the slider in the inner position and the outer position;

providing a spring to urge the lever to move from the inner locate to the outer location when the lever is located at the inner location; and providing means for preventing incorrect insertion of the electronic card into the card receiving space.

8. The method as claimed in claim 7, wherein the slider is moved from the outer position to the inner position by an inserted electronic card while is moved from the inner position to the outer position by the lever urged by the spring.

9. An electrical connector for use with an electronic card, comprising:

an insulative housing defining a card receiving space therein; a plurality of contacts disposed in the housing with contacting sections extending into the card receiving space;

a slider moveable along a front-to-back direction between opposite outer and inner positions, said slider including a driving portion adapted to be engaged with the electronic card for moving forward from the outer position to the inner position via insertion of the electronic card while moving rearward from the inner position to the outer position to eject the electronic card;

a lever located beside the slider and moveable along the front-to-back direction between opposite outer and inner locations, said lever including a buckling portion which is locked to the slider, when said lever is moved to the inner location, for driving the slider from the inner position to the outer position, and is unlocked from the slider, when said lever accompanying the slider moves from the inner location to the outer location, for allowing the slider to move forward from the outer position to the inner position independent therefrom;

the electrical connector further including a spring to urge the lever to move from the inner location to the outer location when the lever is located at the inner location; and a metallic shell assembled to the housing to cover said card receiving space, and said shell having a top wall forms an elastic piece having a flexible piece and a curved piece extending into a holding hole of the to wall to restrict the slider in the inner position and the outer position;

wherein one of the housing and the shell includes a push bulge for confrontation with the lever to urge the lever to move in a transverse direction perpendicular to said front-to-back direction between the inner location and the outer location.

10. The electrical connector as claimed in claim 9, wherein at least one of the housing and the shell includes means for preventing incorrect insertion of the electronic card.

* * * * *